April 23, 1968 K. J. HECKER 3,380,035

MULTIPLE ELEMENT ANALOG STORAGE SYSTEM

Filed Aug. 24, 1964 2 Sheets-Sheet 1

KLAUS J. HECKER
INVENTOR.

BY J. M. St. Amand
ATTORNEY

KLAUS J. HECKER
*INVENTOR.*

BY J. M. St. Amand
*ATTORNEY*

United States Patent Office 3,380,035

Patented Apr. 23, 1968

3,380,035

MULTIPLE ELEMENT ANALOG STORAGE SYSTEM

Klaus J. Hecker, Riverside, Calif., assignor to the United States of America as represented by the Secretary of the Navy Filed Aug. 24, 1964, Ser. No. 391,815
18 Claims. (Cl. 340—173)

The invention herein described may be manufactured and used by or for the Government of the United States of America for govenmental purposes without the payment of any royalties thereon or therefor.

The present invention relates to electronic circuitry for storing a multiplicity of electronic voltage levels and more particularly a system of multiple boxcar circuits for storage of a multiplicity of voltage levels. This invention also relates to the use of a new and improved analog storage device in multiple element storage systems. The invention can be used in apparatus for transmitting video data at a reduced frame rate and, therefore, at a reduced data link bandwidth.

Circuits are known which allow storage of one voltage level for a relatively long period of time. One particular type is commonly identified as a "boxcar circuit." In this circuit, a capacitor is used as a storage element and is charged to the voltage level to be stored. This level will not change over short time intervals, since the impedance of all circuit elements connected to the "boxcar circuit" capacitor is made high in order to keep the discharge as low as possible. However, if storage over extremely long periods of time is required, it is difficult to make the impedances of the connected circuits sufficiently high and consequently a discharge of the capacitor may result.

An improved circuit that can be used to memorize an electronic voltage level and which performs a similar function to that of the conventional boxcar circuit is also hereinafter described.

The system of the present invention uses a multiplicity of storage devices of both the above-mentioned types and permits use of such devices even after the stored voltage level has changed.

The present invention describes a system of multiple boxcar circuits or analog storage circuits to be used for storage of a multiplicity of voltage levels; while in conventional systems the stored signals are useful only as long as each individual storage circuit does not deviate from its stored voltage level. The present invention permits use of a stored signal even after a substantial change in the stored voltage level has occurred and will thus extend the useful storage time of a boxcar circuit by orders of magnitude. While the invention can be used with a single boxcar or an analog storage circuit as disclosed herein, its principal application is in systems where a multiplicity of voltage levels are stored, such as television bandwidth reduction systems.

It is an object of the invention to provide a new and improved circuit for storage of an electronic voltage sample.

Another object of the invention is to provide a system for storing a multiplicity of electronic voltage levels.

A further object of the invention is to provide a means for storage of multiple analog voltage levels, and extend the useful storage time of individual analog storage circuits.

Other objects and many of the attendant advanatges of this invention will become readily appreciated as the same becomes better understood by reference to the following detailed description when considered in connection with the accompanying drawings wherein.

Referring now to the drawings like numerals refer to like parts in each of the figures.

Figure 1:
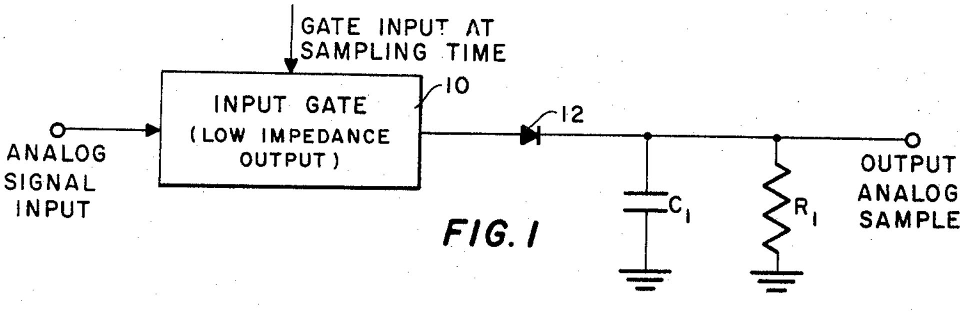
FIG. 1 is a circuit diagram of an analog storage circuit of the present invention.

In the individual analog storage circuit, shown in FIG. 1, the analog signal to be stored is processed through a gate circuit 10 which, upon arrival of a trigger pulse (gate input), passes a pulse of the instantaneous amplitude of the analog signal present at the input. In this circuit, the gate circuit 10 operates in a similar fashion to the gate of a conventional boxcar circuit; however, in the analog storage circuit of FIG. 1 neither a discharge tube nor an output tube is required as in the conventional boxcar circuit. At the end of the input pulse the capacitor $C_1$ is charged via diode 12 to a level proportional to the input level during the interval of the sampling pulse. Capacitor $C_1$ then will discharge as determined by the time constant of the combination of Capacitor $C_1$ and Resistor $R_1$. The exact equation for the discharge is as follows:

$$V_{out}=V_{sample}e^{-\frac{t}{R_1C_1}}$$

If the memorized or stored voltage is used at time $t_0$, the voltage level will be reduced by the factor $$e^{-\frac{t_0}{R_1C_1}}$$

If the voltage $V_1$ is stored, it will be reduced by the same factor compared to the case where voltage $V_2$ is stored; that is, at a given time the output voltage is still proportional to the input voltage.

If the maximum voltage level to be stored in the storage device has decreased at the end of the storage interval to less than the minimum voltage level to be stored in the storage device, no discharge circuit is necessary.

Figure 2:
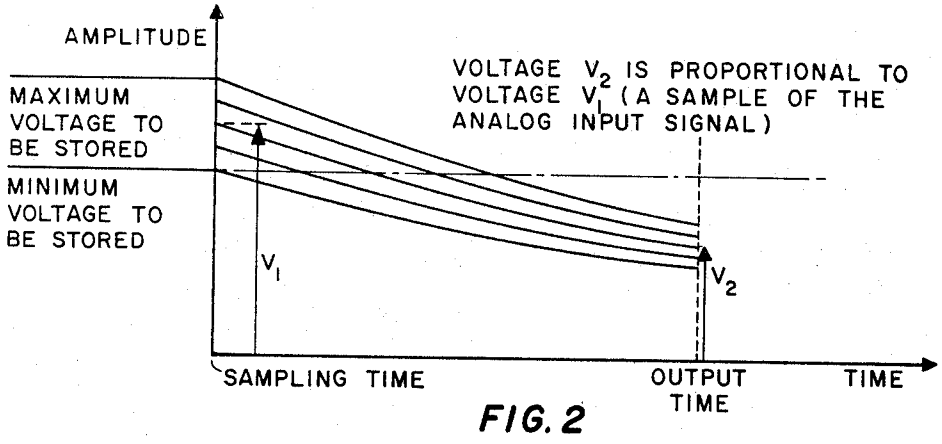
FIG. 2 shows an amplitude vs. time curve for the analog storage circuit of FIG. 1.

FIG. 2, an amplitude vs. time diagram is given, showing the relationship between the capacitor voltage and time. Voltage $V_1$ is the sample of the analog input voltage; voltage $V_2$ is proportional to this voltage. Thus, the analog storage device provides storage of a voltage sample for a certain fixed period of time.

In an alternate form of this analog storage circuit an output amplifier can be used, making it possible to reduce capacitor $C_1$ considerably since resistor $R_1$ can be increased. In this way the impedance requirement of gate 10 is reduced, i.e. gate 10 can charge capacitor $C_1$ in a short period of time even if it does not possess the low impedance required in a conventional boxcar circuit, thus permitting a shorter sampling time. This circuit is especially useful in transistorized circuitry where it is difficult to obtain high impedance.

Figure 3:
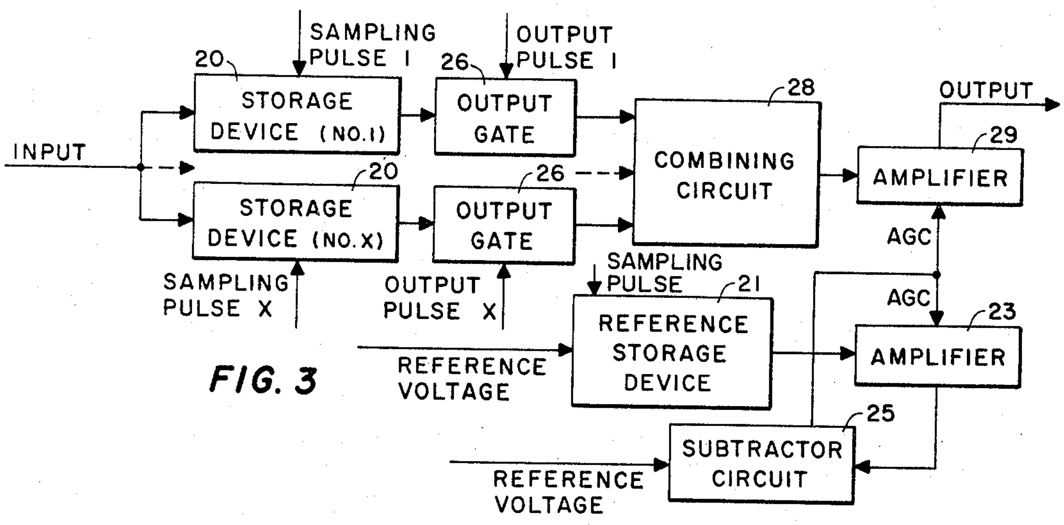
FIG. 3 is a circuit block diagram of a multiple element analog storage system of the present invention.

A block diagram of the analog storage system of the present invention is shown in FIG. 3. This circuitry is specifically useful if a large number (1 to $x$) of storage devices 20 are charged at the same time (or nearly the same time) and the output of the storage devices is used after a certain minimum time interval in a sequential fashion. Storage devices as in FIG. 1 or conventional boxcar circuits can be used in this analog storage system; and they may be charged from a common input as shown or from separate individual inputs. In this system one additional storage device is used as a reference storage device 21. At the time when all the other storage devices 20 are charged, the reference storage device 21 is charged with the reference voltage. Since storage circuits of this type discharge in an exponential fashion, all circuits will discharge proportionally, if the discharge time constants of all circuits are made identical. The output voltage of the reference storage device 21 is then fed to and amplified in a variable gain amplifier 23 and in turn is fed to a subtraction circuit 25 where it is compared to the reference voltage. Many suitable circuits for use as a subtractor circuit, which is basically a difference amplifier, can be found in the text Differential Amplifiers by R. D. Middlebrook, John Wiley & Sons Inc., 1963, a basic circuit being found on page 92. The result of this comparison is used to control the gain of the amplifier 23. Consequently the gain of amplifier 23 will adjust itself through the gain control loop in such a way that the output of the amplifier is always equal to the reference voltage. The outputs of the signal storage devices 20 are gated out through respective output gates 26 into a combining or adding circuit 28 and amplified in an identical variable gain amplifier 29 which always has the same gain as amplifier 23 connected to the output of reference storage device 21. The output of amplifier 29 consequently will be the same as the original level stored into the particular signal storage device 20 connected to the amplifier 29.

Figure 4:
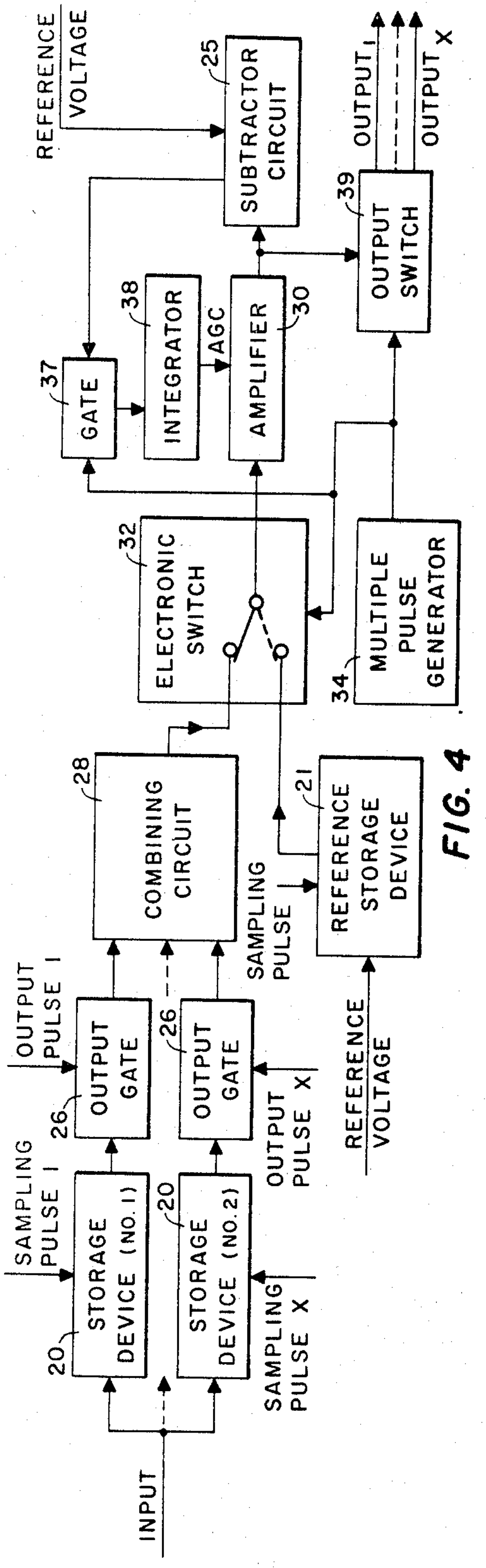
FIG. 4 is a variation of the analog storage system of FIG. 3 using a single variable gain amplifier.

As shown in FIG. 4, a variation of the system shown in FIG. 3 can be obtained by eliminating one of the two variable gain amplifiers. This arrangement has the advantage that the same amplifier 30 is used for both the reference storage device 21 and all the signal storage devices 20. Consequently, it is not necessary to construct two completely identical amplifiers. Amplifier 30 is used in a multiplex fashion, i.e., part of the time it is used to amplify the output of the reference storage device 21 and part of the time it is used to amplify the output from the combining circuit 28. This is done by means of an electronic switch 32 controlled by a square wave generator 34 for example. The automatic gain control circuit AGC, which consists of subtractor circuit 25, a gate 37 and an integrator 38 (or a low-pass filter) operates only when reference storage device 21 is connected to amplifier 30. A simple circuit for integrator 38 can be found in the text Computers, Their Operation and Application by Berkeley and Wainwright, Reinhold Publishing Corp., 1956, pp. 106 and 107. When the reference storage device 21 is connected to amplifier 30, the resulting output voltage is subtracted from the reference voltage by subtractor circuit 25. The resulting difference signal is fed via gate 37 to integrator 38. This gain control loop assures that the output of amplifier 30 is always equal to the reference voltage whenever the AGC circuit is in operation; this takes place whenever the reference storage device 21 is connected to the input of amplifier 30. A multiple pulse generator 34, for example, operates to control electronic switch 32, gate 37 and an output electronic switch 39. When reference storage device 21 is not connected to amplifier 30, gate 37 does not conduct and thus prevents any other output of amplifier 30 from affecting the AGC circuit voltage. The AGC voltage fed to amplifier 30 is continuously available since it is stored in integrator 38.

Figure 5:
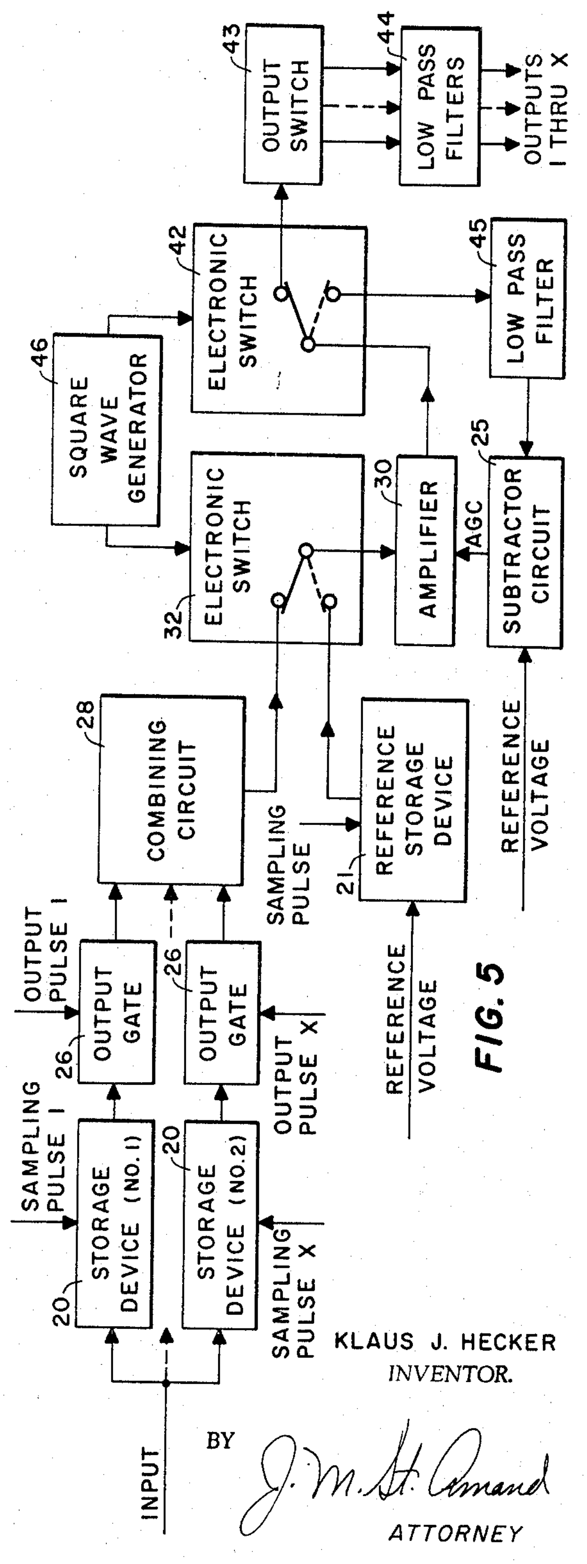
FIG. 5 shows another variation of the analog storage system using one variable gain amplifier with two electronic switches.

In another variation of the system shown in FIG. 5, two electronic switches 32 and 42 are used which are switched simultaneously. The outputs of electronic switch 42 are either connected via output switch 43 (similar to 39, FIG. 4) to low pass filters 44 and in turn to outputs 1 thru $x$, or to low pass filter 45 and in turn to subtractor circuit 25. Filters 44 and 45 smooth the pulse-type waveform received from the electronic switch. It is possible to synchronize the squarewave generator 46, which controls electronic switches 32 and 42, with the system generating the output pulses for the storage device output gates 26. Alternately, the timing of the system may be such that several storage device signals are connected to the output, before the reference storage device is sampled and an AGC signal is generated. This sequence is then repeated. This arrangement can be used if the outputs of the storage devices have to be available in rapid succession on a continuous basis.

For use of the above circuits, all sampling pulses must occur within a time interval which is short compared to the discharge time constant of all storage devices.

Figure 6:
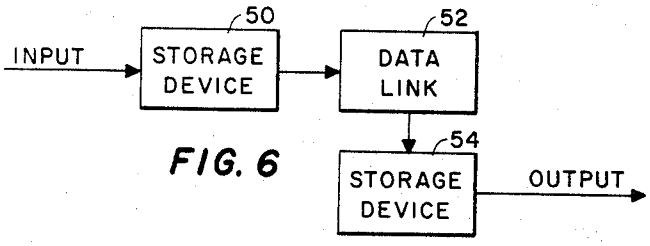
FIG. 6 shows a block diagram of a sampled data link circuit using storage devices as in FIG. 1.

FIG. 6 shows a block diagram of a system that is used for transmission of a sampled signal at lower bandwidth than the one required for transmission of the signal itself. In this system one segment of the signal is sampled at the transmitter station, the information from the different resolution elements stored in storage device(s) 50, transmitted sequentially over a data link 52, stored in storage device(s) 54 again and sampled at the correct timing so that it provides segments of the original signal. This system can be used for the transmission of television pictures at rates lower than the original frame rate of the system. The present storage circuit reduces cost of this system considerably since it eliminates all the discharge circuits from all the storage devices. Only one channel is shown in FIG. 6 and it is understood that there are several storage device circuits 50 in parallel which are sampled at different times and gated into the data link 52 at different times and also several storage device circuits 54 which are charged from data link 52 at different times and connected to the output at different specific times. However, the time interval between charging of a storage device 50 and the connection of the corresponding storage device 54 to the output in a system of this type is fixed. After a storage device 50 has been charged with the proper voltage level, it will discharge as shown by the following function:

$$V_1=(V_{\text{sample}})_1 e^{-\frac{t}{R_1C_1}}$$

If this level ($V_1$) is transmitted through the data link at time $t_0$, storage device 54 will be charged with the following level:

$$(V_{\text{sample}})_2=(V_{\text{sample}})_1 e^{-\frac{t_0}{R_1C_1}}$$

Storage device 54 will then discharge according to the following function:

$$V_2=(V_{\text{sample}})_2 e^{-\frac{t-t_0}{R_2C_2}}$$

If the discharge time constant of both storage devices 50 and 54 is identical and equal to RC, it follows that:

$$V_s=(V_{\text{sample}})_1\left[e^{-\frac{t_0}{RC}}\right]\left[e^{-\frac{t-t_0}{RC}}\right]=(V_{\text{sample}})_1 e^{-\frac{t}{RC}}$$

This equation shows that the discharge of storage device 54 is independent of the specific time the transmission takes place. The discharge of storage device 54 is identical to the discharge of storage device 50. If storage device 54 is gated into the output at a specific time interval after the input was gated into storage device number 50, the output signal from storage device 54 must be proportional to the input level of storage device number 50 during the sampling interval, as was explained above for a single storage device.

The above circuits are used only if the interval between sampling and use of the stored voltage level is constant.

Obviously many modifications and variations of the present invention are possible in the light of the above teachings. It is therefore to be understood that within the scope of the appended claims the invention may be practiced otherwise than as specifically described.

What is claimed is:

1. A multiple channel analog storage system for storing a multiplicity of electronic voltage levels and which permits the use of a signal even after a substantial change in the stored voltage level, comprising:

(a) a plurality of storage devices, each of which will store a signal voltage level for a period of time,
(b) one of said storage devices being used as a reference storage device,
(c) all of the storage devices being charged with a voltage level at substantially the same time, said reference storage device being charged with a reference voltage and the other of said storage devices being charged with an input signal,
(d) first and second identical variable gain amplifying means,
(e) said first variable gain amplifying means for amplifying the output of said reference storage device,
(f) automatic gain control means to which the output of said first amplifying means is fed and compared to said reference voltage, the result of this comparison being fed to and used to control the gain of both of said amplifying means,
(g) the output of said first amplifying means always being substantially equal to said reference voltage by automatic gain adjustment of said first amplifying means by said automatic gain control means,
(h) an output gating means for each of the other of said storage devices,
(i) a combining circuit,
(j) the outputs of the other of said storage devices being individually gated out through said output gating means into said combining circuit as desired,
(k) said combining circuit in turn connecting certain outputs from said gates to said second amplifying means which always has the same gain as said first amplifier means since both amplifiers are controlled by said automatic gain control means,
(l) the output of said second amplifier thus being at substantially the original level stored into a particular signal storage device connected to the second amplifier at a particular time.

2. A system as in claim 1 wherein the number of the other of said storage devices is more than one and whose outputs are used after a certain minimum time interval in a sequential fashion.

3. A system as in claim 1 wherein said storage devices have substantially identical discharge time constants and discharge proportionally in an exponential fashion.

4. A system as in claim 1 wherein each of said storage devices comprise a conventional boxcar circuit.

5. A system as in claim 1 wherein each of said storage devices comprise:

(a) a gating circuit for processing an analog signal to be stored,
(b) means for triggering the gating circuit to pass a pulse of the instantaneous amplitude of the analog signal present at the gating circuit input,
(c) a diode,
(d) a storage capacitor,
(e) a resistor,
(f) said capacitor and resistor being connected to the output of said gating circuit via said diode,
(g) said storage capacitor being charged via said diode to a level proportional to the input level to said gating circuit during a sampling time where said triggering means allows the analog signal present at the gating circuit input to pass through said gating circuit,
(h) said capacitor discharging as determined by the time constant of the combination of said capacitor and said resistor, the interval between said sampling time and the time the stored level is used being of substantially the same order of magnitude as said time constant.

6. A device as in claim 1 wherein each of said storage devices is charged from a separate individual input.

7. A multiple channel analog storage system for storing a multiplicity of electronic voltage levels and which permits use of a signal even after a substantial change in the stored voltage level, comprising:

(a) a plurality of storage devices, each of which will store a signal voltage level for a period of time,
(b) one of said storage devices being used as a reference storage device,
(c) all of the storage devices being charged with a voltage level of substantially the same time, said reference storage device being charged with a reference voltage and the other of said storage devices being charged with an input signal,
(d) an output gating means for each of the other of said storage devices,
(e) a combining circuit,
(f) the outputs of the other of said storage devices being individually gated out through said output gating means into said combining circuit as desired,
(g) a variable gain amplifying means,
(h) means for selectively connecting either the outputs of said combining circuit or the output of said reference storage device to said amplifying means,
(i) automatic gain control means to which the output of said amplifying means is fed and compared to said reference voltage during the time said reference storage device is connected to said amplifying means, the result of this comparison being fed to and used to control the gain of said amplifying means to assure that the output of said amplifying means is substantially equal to said reference voltage,
(j) means for preventing any output from said amplifying means from affecting said automatic gain control means during the time said reference storage device is not connected to the amplifying means input, the automatic gain control voltage being continuously available to said amplifying means.

8. A system as in claim 7 wherein the number of the other of said storage devices is more than one and whose outputs are used in a sequential fashion, and whose respective outputs from said amplifying means are fed out through separate respective output channels.

9. A system as in claim 7 wherein said storage devices have substantially identical discharge time constants and discharge proportionally in an exponential fashion.

10. A system as in claim 7 wherein each of said storage devices comprise a conventional boxcar circuit.

11. A system as in claim 7 wherein each of said storage devices comprise:

(a) a gating circuit for processing an analog signal to be stored,
(b) means for triggering the gating circuit to pass a pulse of the instantaneous amplitude of the analog signal present at the gating circuit input,
(c) a diode,
(d) a storage capacitor,
(e) a resistor,
(f) said capacitor and resistor being connected to the output of said gating circuit via said diode,
(g) said storage capacitor being charged via said diode to a level proportional to the input level to said gating circuit during a sampling time where said triggering means allows the analog signal present at the gating circuit input to pass through said gating circuit,
(h) said capacitor discharging as determined by the time constant of the combination of said capacitor and said resistor, the interval between said sampling time and the time the stored level is used being of substantially the same order of magnitude as said time constant.

12. A multiple channel analog storage system for storing a multiplicity of electronic voltage levels and which permits use of a signal even after a substantial change in the stored voltage level, comprising:

(a) a plurality of storage devices, each of which will store a signal voltage level for a period of time,
(b) one of said storage devices being used as a reference storage device,
(c) all of the storage devices being charged with a voltage level of substantially the same time, said reference storage device being charged with a reference voltage and the other of said storage devices being charged with an input signal,
(d) an output gating means for each of the other of said storage devices,
(e) a combining circuit,
(f) the outputs of the other of said storage devices being individually gated out through said output gating means into said combining circuit as desired,
(g) a variable gain amplifying means,
(h) first selection means for selectively connecting either the outputs of said combining circuit or the output of said reference storage device to said amplifying means,
(i) output filter means for smoothing pulse-type output from said amplifying means,
(j) automatic gain control means to which the output of said amplifying means is fed and compared to said reference voltage during the time said reference storage device is connected to said amplifying means, the result of this comparison being fed to and used to control the gain of said amplifying means to assure that the output of said amplifying means is substantially equal to the reference voltage,
(k) a second selection means, said second selection means selectively connecting the outputs of said amplifying means to either said output filter means or said automatic gain control means.

13. A device as in claim 12 wherein the outputs from said amplifying means are fed through separate channels of said output filter means to separate output channels.

14. A system as in claim 12 wherein said storage devices have substantially identical discharge time constants and discharge proportionally in an exponential fashion.

15. A system as in claim 12 wherein each of said storage devices comprise a conventional boxcar circuit.

16. A system as in claim 12 wherein each of said storage devices comprise:
(a) a gating circuit for processing an analog signal to be stored,
(b) means for triggering the gating circuit to pass a pulse of the instantaneous amplitude of the analog signal present at the gating circuit input,
(c) a diode,
(d) a storage capacitor,
(e) a resistor,
(f) said capacitor and resistor being connected to the output of said gating circuit via said diode, (g) said storage capacitor being charged via said diode to a level proportional to the input level to said gating circuit during a sampling time where said triggering means allows the analog signal present at the gating circuit input to pass through said gating circuit,
(h) said capacitor discharging as determined by the time constant of the combination of said capacitor and said resistor, the interval between said sampling time and the time the stored level is used being of substantially the same order of magnitude as said time constant.

17. A device as in claim 12 wherein each of said storage devices is charged from a separate individual input.

18. A multiple channel analog storage system for storing a multiplicity of electronic voltage levels and which permits use of a signal even after a substantial change in the stored voltage level, comprising:
(a) a plurality of storage devices, each of which will store a signal voltage level for a period of time,
(b) one of said storage devices being used as a reference storage device,
(c) all of the storage devices being charged with a voltage level at substantially the same time, said reference storage device being charged with a reference voltage and the other of said storage devices being charged with an input signal,
(d) variable gain amplifying means,
(e) automatic gain control means to which the output of said amplifying means is fed and compared to said reference voltage, the result of this comparison being fed to and used to control said amplifying means, the output of said amplifying means being substantially equal to said reference voltage by automatic gain adjustment,
(f) an output gating means for each of the other of said storage devices,
(g) a combining circuit,
(h) the outputs of the other of said storage devices being individually gated out through said output gating means into said combining circuit as desired,
(i) said combining circuit in turn connecting certain outputs from said gates to said amplifying means whose output is substantially at the original level stored into a particular signal storage device connected to the amplifier at that time.

References Cited

UNITED STATES PATENTS 3,050,673 8/1962 Widmer ------------ 340—173

TERRELL W. FEARS, *Primary Examiner.*